Feb. 23, 1971     J. W. TAYLOR, JR     3,566,402
MTI RADAR SYSTEM UTILIZING UNIQUE PATTERNS OF INTERPULSE
PERIOD CHOICES TO SIMPLIFY WEIGHTING COEFFICIENTS
FOR INDIVIDUAL ECHO PULSES
Filed Nov. 18, 1968     5 Sheets-Sheet 1

WITNESSES:
Bernard R. Gieguey
James F. Young

INVENTOR
John W. Taylor, Jr.

BY Ernest P. Klipfel
ATTORNEY

United States Patent Office
3,566,402
Patented Feb. 23, 1971

3,566,402
MTI RADAR SYSTEM UTILIZING UNIQUE PATTERNS OF INTERPULSE PERIOD CHOICES TO SIMPLIFY WEIGHTING COEFFICIENTS FOR INDIVIDUAL ECHO PULSES
John W. Taylor, Jr., Baltimore, Md., assignor to Westinghouse Electric Corporation, Pittsburgh, Pa., a corporation of Pennsylvania
Filed Nov. 18, 1968, Ser. No. 776,409
Int. Cl. G01s 9/42
U.S. Cl. 343—7.7                                         9 Claims

ABSTRACT OF THE DISCLOSURE

A variable interpulse period sequence is used in a digital MTI radar system which follows an exponentially increasing and/or decreasing pattern to reduce the number of sets of weights which must be stored within the system to achieve an optimum velocity response characteristic.

CROSS REFERENCE TO RELATED APPLICATIONS

Reference is made to a copending application entitled "Apparatus and Method For Improving the Velocity Response of an MTI Radar by Sinusoidally Varying the Interpulse Period," Ser. No. 772,701 filed Nov. 1, 1968, by Edward C. Waters and Thomas M. Moore and another copending application entitled "Apparatus for Flexibly Weighting Received Echoes In a Moving Target Indicator Radar," Ser. No. 776,410, filed Nov. 18, 1968, by the present inventor each of which are assigned to the common assignee of this application.

BACKGROUND OF THE INVENTION

Field of the invention

The present invention relates generally to moving target indicator (MTI) radars and more particularly relates to apparatus and method for optimizing the variable interpulse period and the weighting coefficients in such a manner to obtain all the desired benefits of digital MTI systems in the simplest and least expensive manner.

Description of the prior art

The concept of varying both the interpulse period and the weighting of the pulse echoes in an MTI canceller has been disclosed and claimed in the aforementianed patent application Ser. No. 776,410. This technique has been shown to yield a very smooth velocity of response in the region of desired target velocities, having no velocities in the desired region where blindness or serious loss of sensitivity occurs. At the same time, it produces a clutter rejection notch which is significantly wider than would otherwise be possible. The combination of these characteristics have never before been obtainable and have been made possible without undue complexity by providing a wide variation in both interpulse period and weighting.

The aforementioned patent application describes in detail how the weights should be varied for a four pulse canceller to optimize the velocity response for any variable interpulse period (VIP) pattern. Many possible combinations of interpulse period patterns and weights may be produced by using the described technique, but the ease and cost of implementation can be significantly affected by the particular choice.

SUMMARY OF THE INVENTION

An object of the present invention is to provide apparatus and method in which all the benefits of variable interpulse period and weighting may be achieved at minimum cost.

Another object of the present invention is to provide in a digital MTI radar system apparatus utilizing specific patterns of interpulse period variation.

Another object of the present invention is to provide in a digital MTI radar system apparatus utilizing unique patterns of interpulse period choices which minimize the number of weights which must be employed, achieving all the performance benefits at a minimum of cost.

Briefly, the present invention accomplishes the above cited objects and other objects and advantages by providing a PRF sequence controller and time interval counter which provides a variable interpulse period sequence following an exponentially increasing and/or decreasing pattern. The incremental increase over the last transpired period between pulses may be made in a binary or decimal increment to simplify the logic circuits within a canceller. The canceller applies an appriopriate choice of weighting factors to each of the pulse echoes to obtain a wider clutter notch than heretofore available.

BRIEF DESCRIPTION OF THE DRAWINGS

Further objects and advantages of the present invention will be readily apparent from the following detailed description taken in conjunction with the drawings, in which:

As a standard for comparison, FIG. 1 shows the velocity of response A of a prior art four pulse MTI canceller used in a digital MTI radar system. Note that both coordinates of the curve A are logarithmic, so the nominal shape of the clutter notch is a straight line of slope 3. Below —40 db, unfortunately, the slope of the notch decreases due to the intentional variation of interpulse period which is necessary to obliterate blind speeds which occur at integer numbers on the normalized range rate scale. The curve A is obtained when a sinusoidally varying variable interpulse period is used with sixteen different values occurring every cycle. The four pulse echoes being processed at any one instant of time are weighted with fixed binominal values (1, 3, 3, 1).

The first task of an MTI radar system is to reject clutter from slowly moving echoes. This movement may be due to actual motion of the clutter, such as windblown leaves and branches, motion of the radar antenna surface due to scanning, or motion of the radar platform. In most applications, this velocity spectrum is sufficiently broad that it is difficult to provide as wide a clutter notch as desirable. Width of the clutter notch is a prime measure of performance.

The parameters of the radar system such as bandwidth, beamwidth and frequency, determine the magnitude of the clutter problem; that is, how much larger the clutter radar cross-section is likely to be than the desired target. Then, since one usually wishes a high probability of detection of the target and a low probability of detection of the clutter, an additional margin of the order of 10 to 12 db should be added. In a typical case, 60 db of clutter suppression is necessary if target detectability is not to be degraded when it is immersed in clutter. Thus, each radar application defines the critical level of the clutter notch at which its width is important and below which its shape is unimportant. A representative value —60 db will be used as the approximate critical level for purposes of illustration.

Figure 1:
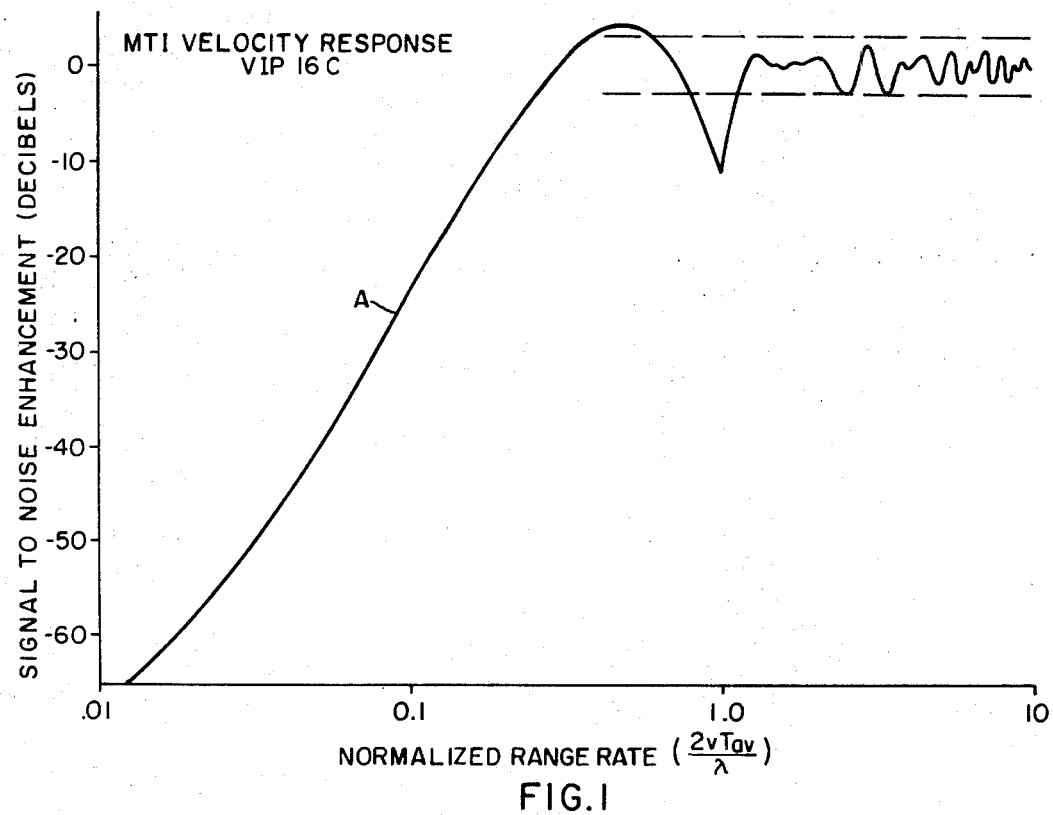
FIG. 1 is a graphical representation of velocity response characteristics which occur when practicing prior art systems.

The second task of a canceller in an MTI radar system is to detect all targets within a specific band of range rates. Ideally, the detectability should not be influenced by what radial velocity the target has within the specified band, but some regions of insensitivity are unavoidable. Tolerance limits of ∓3 db are shown in FIG. 1 as dashed lines. Although there may be some argument about what are tolerable limits to insensitivity, the 3 db lines provide a visual reference for comparison purposes.

The range rate is defined by both speed and heading of the target, and neither will remain perfectly constant. If one assumes a 1% rms variation in range rate from scan to scan, the shape of the velocity response above 25 is unimportant, because a deviation of 1% will cause the echo to move out of the insensitive region regardless of its depth. The first null is most important, because a desired target can remain in this region for long periods of time. This is precisely the region where the MTI systems of the prior art have provided the poorest performance, for reasons to be discussed hereinafter. Above this velocity, two measures of velocity response characteristic seem useful: the minimum response in the region between $V=1$ and $V=25$ although insensitivities are more tolerable near the uper end of this velocity range than near the lower, and the percentage of velocities within the region of interest which create more than a 3 db loss of detectability.

The third important characteristic is the number of interpulse period choices which must be employed in the VIP cycle. Obviously, to insure detection of the target, the VIP cycle must be completed within the time that the antenna is receiving echoes from the target. The number of choices of interpulse period must be less than the number of pulses in the two-way 3 db beamwidth or 70% of the number of pulses within the one-way 3 db beamwidth. Actually, it is desirable to complete the VIP cycle at least twice during the dwell time to prevent the maximum echo intensity from occurring at the optimum part of the VIP cycle rather than at the time that the antenna is pointed directly at the target. An apparent wandering of the target from one side of the beam to the other can be very disturbing to an operator.

FIG. 1 shows the effect of this restraint on a radar system which provides only 20 pulses within the 3 db two-way beamwidth. Although a VIP cycle containing no more than 10 choices of interpulse period would have been desirable, 16 had to be employed and some degree of azimuth wandering tolerated. Even with 16 choices, arranged in the optimum sinusoidal pattern of patent application Ser. No. 772,701, the deviation in interpulse period could not increase sufficiently to prevent serious insensitivity near unit velocity without further degradation of the clutter notch at the —60 db level.

A steep clutter notch is desirable so that desired targets may be detected with low velocities. The —3 db point on the clutter notch is a useful definition for minimum detectable range rate, and the ratio of —60 db to —3 db velocities defines the steepness of the notch. Although the notch steepness is largely determined by the number of pulses used by the canceller, other influences can have significant effect.

Curve A of FIG. 1 represents an actual radar performance of the prior art and its velocity response is superior in all respects to any other known prior art systems. The velocity response defined by curve A is superimposed on FIGS. 2 through 5 to clearly bring out areas of improvement which will occur when practicing the present invention.

Desirable weighting factors for a four pulse canceller are derived in the aforementioned copending application Ser. No. 776,410. It can be shown that for all conditions whether with modest or large steps of interpulse period that the coefficients or four pulses in a sequence in the digital MTI radar namely for A, B, C and D the weighting factors $a$, $b$, $c$ and $d$ respectively are determined:

$a \approx 1 + \frac{3}{2}(\Delta + T2/T2) + \frac{1}{2}(\Delta T2/T2)^2$
$d \approx 1 - \frac{3}{2}(\Delta T1/T1) + \frac{1}{2}(\Delta T1/T2)^2$
$b \approx 4 - d - m - k$
$c \approx 4 - a - m - k$ where:
$m \approx 4(\Delta T1/T2) + [3\frac{1}{2}(\Delta T1/T2 - \Delta T2/T2)](\Delta T1/T2)$
$\quad (\Delta T2/T2) - (\Delta T1/T2)^2 - (\Delta T2/T2)^2$
$a$ = coefficient of oldest echo.
$b$ = coefficient of second oldest echo.
$c$ = coefficient of third oldest echo.
$d$ = coefficient of latest echo.
$T_1$ = interval between pulses weighted $a$ and $b$.
$T_2$ = interval between pulses weighted $b$ and $c$.
$T_3$ = interval between pulses weighted $c$ and $d$.
$\Delta T_1 = T_2 - T_1$
$\Delta T_2 = T_3 - T_2$
$k$ = constant which produces null in velocity response
$V = \sqrt{k/2\pi}$ The approximation in the above equations involve only a scaling factor. The correction is usually small and can be added after the summation if necessary, so the above simple equations may be used to achieve optimum design.

Optimum design will provide the widest notch width at the critical level, expressed as the percentage of —3 db velocity. A smooth velocity from 0.3 to 25 times the normalized velocity will be obtained with prime emphasis on minimizing insensitivity in the 0.3 to 5 region. By using a small number of interpulse period choices the canceller is suitable for rapidly scanning radars which provide only a modest number of echoes from each target. The cost of such a system can be minimized by employing the smallest number of weight changes and the least number of bits employed in weights.

Inspection of the foregoing equations reveals that the weight will remain constant as long as the three interpulse periods being utilized in any four pulse comparison remain on an exponential curve. Furthermore, the weights for a rising exponential are identical with those for a falling exponential, except that the order of usage is reversed. Thus, the smallest number of weights is achieved by the use of an exponential VIP pattern.

With a second objective of limiting the number of interpulse period choices, the percentage changes in interpulse period must be fairly large. A linear VIP pattern would create a blind speed associated with $\Delta T$; an exponential VIP pattern avoids this penalty, allowing only a modest roughness in the velocity response in this region.

Figure 2:
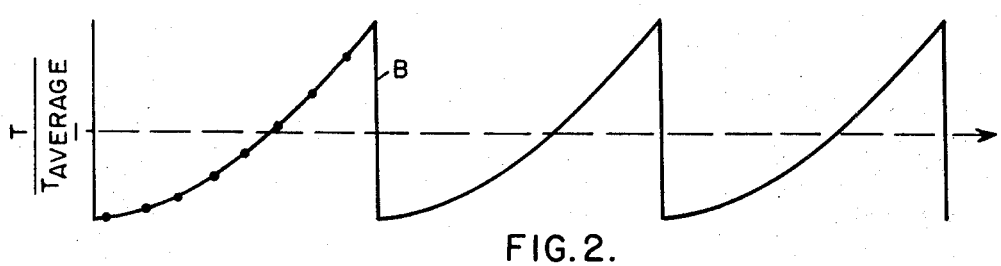
FIGS. 2 and 3 are graphical representations useful in understanding operation of the present invention.
Figure 3:
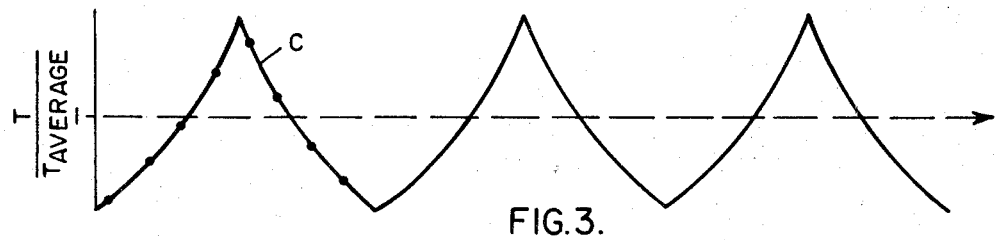

Two forms of exponential VIP patterns may be employed, the exponential sawtooth B of FIG. 2 and the exponential tent C of FIG. 3. These patterns represent the values and sequence of selection of the interpulse period choices.

The exponential sawtooth B requires only a single set of weighting factors if the two outputs of the MTI associated with a flyback region of the curve can be blanked (equivalent to applying zero weights). This is a reasonable sacrifice for a radar which does not use MTI to its maximum coverage range; at the shorter range where detection is limited by clutter rather than noise, the loss of energy is of no importance.

The exponential sawtooth B requires only three sets of weighting factors if the flyback outputs are not thrown away. No matter how many pulses in excess of three are in the VIP cycle, one set of factors suffices for all conditions except flyback. The weighting factors $a$, $b$, $c$ and $d$ will be outlined hereinafter.

The exponential tent waveform c, if one is to achieve a reasonably smooth velocity response with a small number of pulses in the VIP cycle, requires that there be no duplication of interpulse period choices in the cycle. Hence, two sets of weighting factors at each turn-around point or a total of six sets are necessary, regardless of how many pulses in excess of six are in the VIP cycle.

Typical VIP patterns for exponential sawtooth and exponential tent variations in the interpulse period for different numbers of interpulse periods are shown in Table I.

tolerable in the VIP cycle, the penalties of losing two outputs become insignificant, and this pattern is advantageous. Another application is in electronically scanned antennas, where good clutter cancellation demands a step-scan mode of operation, and blanking of output pulses is mandatory, regardless of VIP pattern.

As far as performance is concerned, Table I clearly indicates that the 10 pulse exponential tent pattern provides the smoothest velocity response. Its sequence of ten interpulse periods and corresponding six sets of weights must be stored, so more hardware is required than other

TABLE I

| | Parabolic 16C | Tent | | VIP Pattern No. of interpulse periods 8B— | Saw | | | Saw W/O Flyback | | |
|---|---|---|---|---|---|---|---|---|---|---|
| | | 8 | 10 | | 8 | 7A | 8A | 8 | 8A | 10 |
| Deviations from average interpulse period, percent | (¹) | −30.05<br>−15.35<br>+2.43<br>+23.94<br>+36.33<br>+12.67<br>−6.89<br>−23.06 | −37.25<br>−24.07<br>−8.13<br>+11.15<br>+34.48<br>+47.92<br>+22.25<br>+1.04<br>−16.48<br>−30.98 | +37.61<br>+24.70<br>+12.98<br>+2.42<br>−7.20<br>−15.88<br>−24.78<br>−30.92 | −30.05<br>−23.06<br>+15.35<br>−6.89<br>+2.43<br>+12.67<br>+23.94<br>+36.33 | −31.58<br>−23.03<br>−13.41<br>−2.59<br>+9.59<br>+23.29<br>+38.70 | −36.14<br>−28.16<br>−19.18<br>−9.08<br>+2.29<br>+15.07<br>+29.45<br>+45.63 | −30.05<br>−23.06<br>−15.35<br>−6.89<br>+2.43<br>+12.67<br>+23.94<br>+36.33 | −36.14<br>−28.16<br>−19.18<br>−9.08<br>+2.29<br>+15.07<br>+29.45<br>+45.63 | −37.25<br>−30.98<br>−24.07<br>−16.48<br>−8.13<br>+1.04<br>+11.15<br>+22.25<br>+34.48<br>+47.92 |
| Minimum output from MTI (db) near: | | | | | | | | | | |
| V=1 | −10.8 | −4.2 | −2.0 | −2.5 | −2.9 | −2.1 | −1.6 | −7.7 | −4.4 | −3.6 |
| V=T/ΔT | −3.3 | −5.0 | −3.5 | −4.2 | −5.0 | −5.1 | −5.3 | −7.1 | −4.9 | −4.4 |
| V=2T/ΔT | | −3.4 | −3.8 | −5.4 | −4.5 | −5.2 | −6.0 | −5.3 | −6.6 | −5.0 |
| Percent of velocities providing less output than −3 db (1<V<24) | 1.8 | 6.5 | 3.0 | 8.7 | 4.3 | 10.9 | 9.1 | 8.7 | 11.3 | 4.8 |
| Response at: | | | | | | | | | | |
| V≤.032 (db) | −50.19 | −59.04 | −57.56 | −59.61 | −57.46 | −56.09 | −60.36 | −61.03 | −60.39 | −61.27 |
| V≤.035 (db) | −47.86 | −56.22 | −54.41 | −58.77 | −57.46 | −54.20 | −56.68 | −60.36 | −55.75 | −57.62 |

¹ −21.30 minimum to +21.47 maximum.

The response shown in Table I are for specific sets of binary approximations to desired weighting factors and may be modified by use of slightly different approximations. Although the objective in each case is to produce the widest clutter notch at the −60 db level, the spread of values is indicative of the round-off effect in the weights, particularly at the turn-around or flyback points.

In comparing the velocity responses of these three VIP patterns in Table I, it is well to understand the basic character of any exponential pattern. The degree to which the insensitivity at $V=1$ is eliminated is determined almost solely by the ratio of maximum to minimum interpulse period. The insensitive regions at higher velocities occur between $T_{min}/\Delta T_{av}$ and $T_{max}/\Delta T_{av}$, and if any interpulse period is close to twice another, they both go blind together, accentuating the insensitive region near $T_{max}/\Delta T_{av}$. Consequently, as is apparent in the four different saw patterns tabulated, minor shifts in the percentage step in interpulse period can have significant influence on the smoothness of the velocity response.

The exponential sawtooth B of FIG. 2 with the MTI output pulses blanked during flyback does not make effective use of the extreme deviations of interpulse period so, for equivalent performance, its VIP deviations must be greater. This is another penalty to add to the loss of energy, because the minimum interpulse period is often restricted by second-time-around clutter; a wider deviation generally requires a larger average interpulse period. It also requires two extra pulses in the VIP sequence to give comparable performance.

Figure 4:
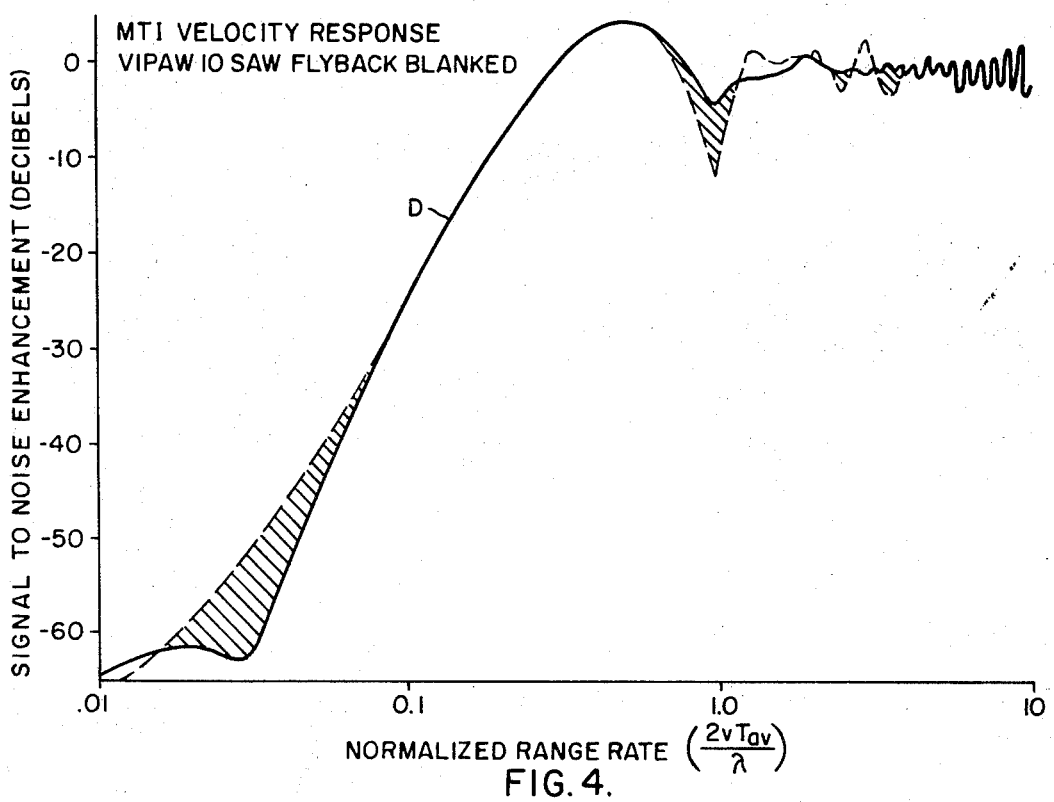
FIGS. 4 through 6 are graphical representations of performance characteristics when practicing the present invention.

Curve D of FIG. 4 presents the velocity response of a ten pulse exponential sawtooth with a minimum interpulse period of 62.75% of the average. The response is a dramatic improvement over the performance exemplified by curve A, but even this wide deviation in interpulse period has not quite restricted the first blind region to −3 db.

For these reasons, the exponential sawtooth with flyback outputs blanked is suitable only for rather limited applications. Where the order of 16 or more pulses are tolerable in the VIP cycle, the penalties of losing two outputs become insignificant, and this pattern is advantageous. Another application is in electronically scanned antennas, where good clutter cancellation demands a step-scan mode of operation, and blanking of output pulses is mandatory, regardless of VIP pattern.

sequences, but the cost is not too significant. The prime penalties are a narrower clutter notch, a minimum interpulse period of 62.75% of the average, and a longer time required for the ten pulse sequence; where the application is sensitive to any of these characteristics, the exponential sawtooth represents a better compromise.

Figure 5:
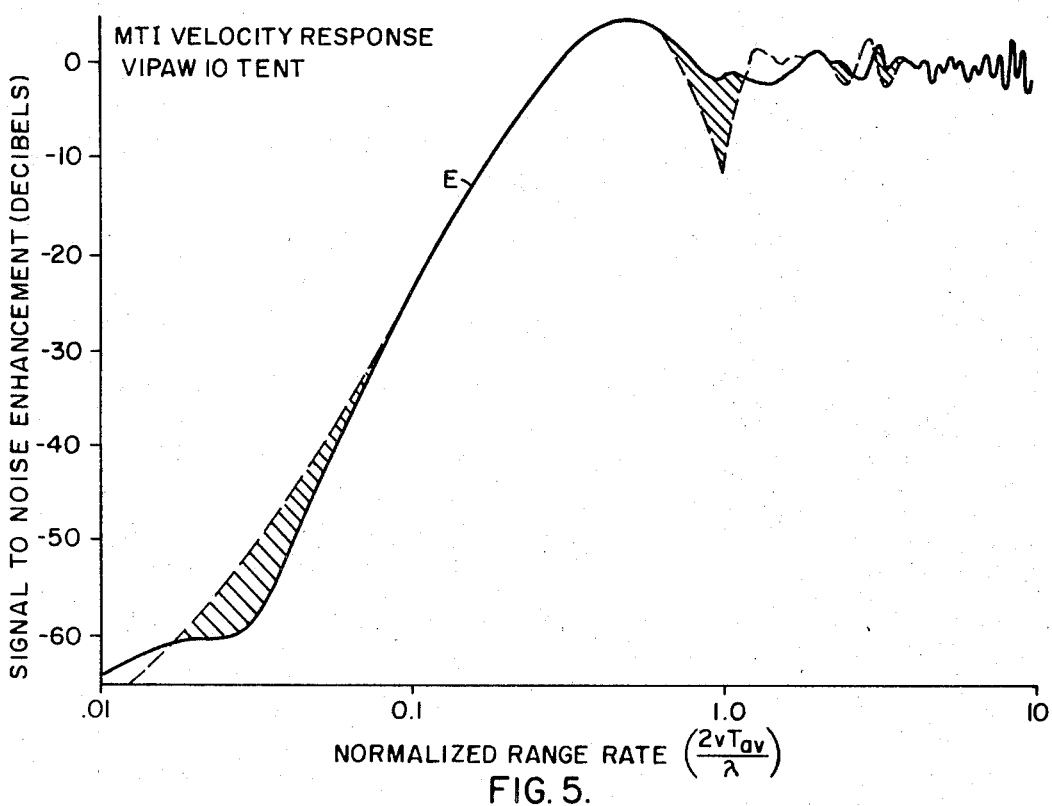
Figure 6:
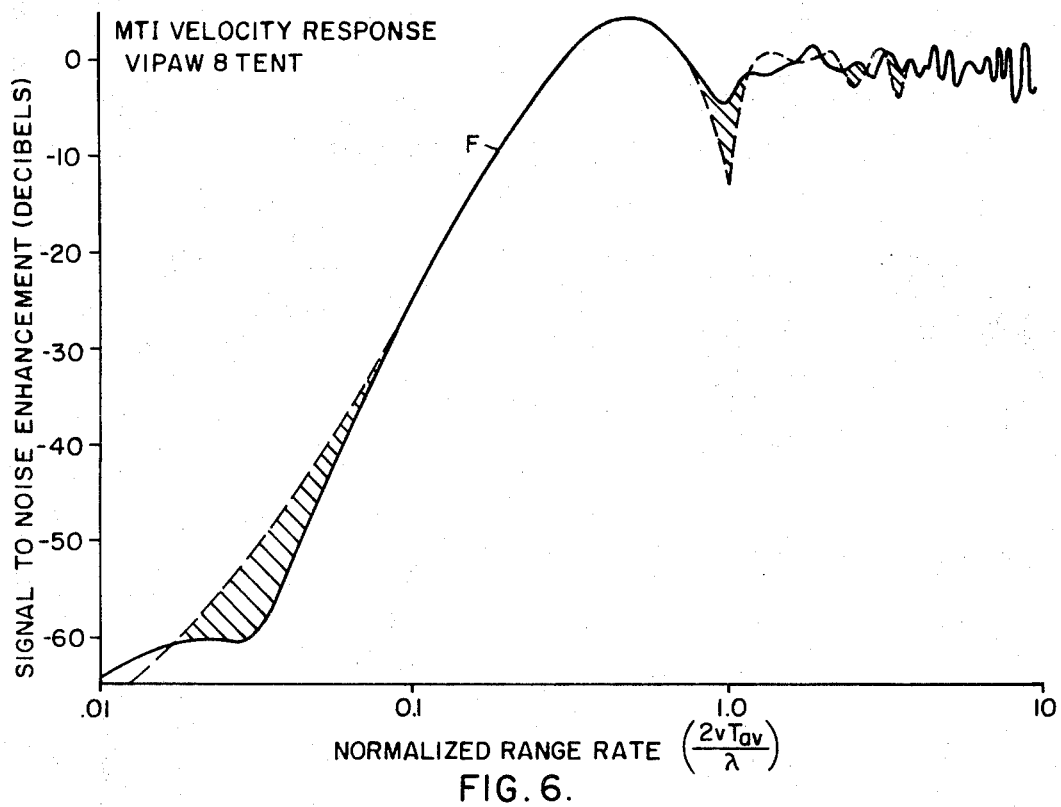
Figure 7:
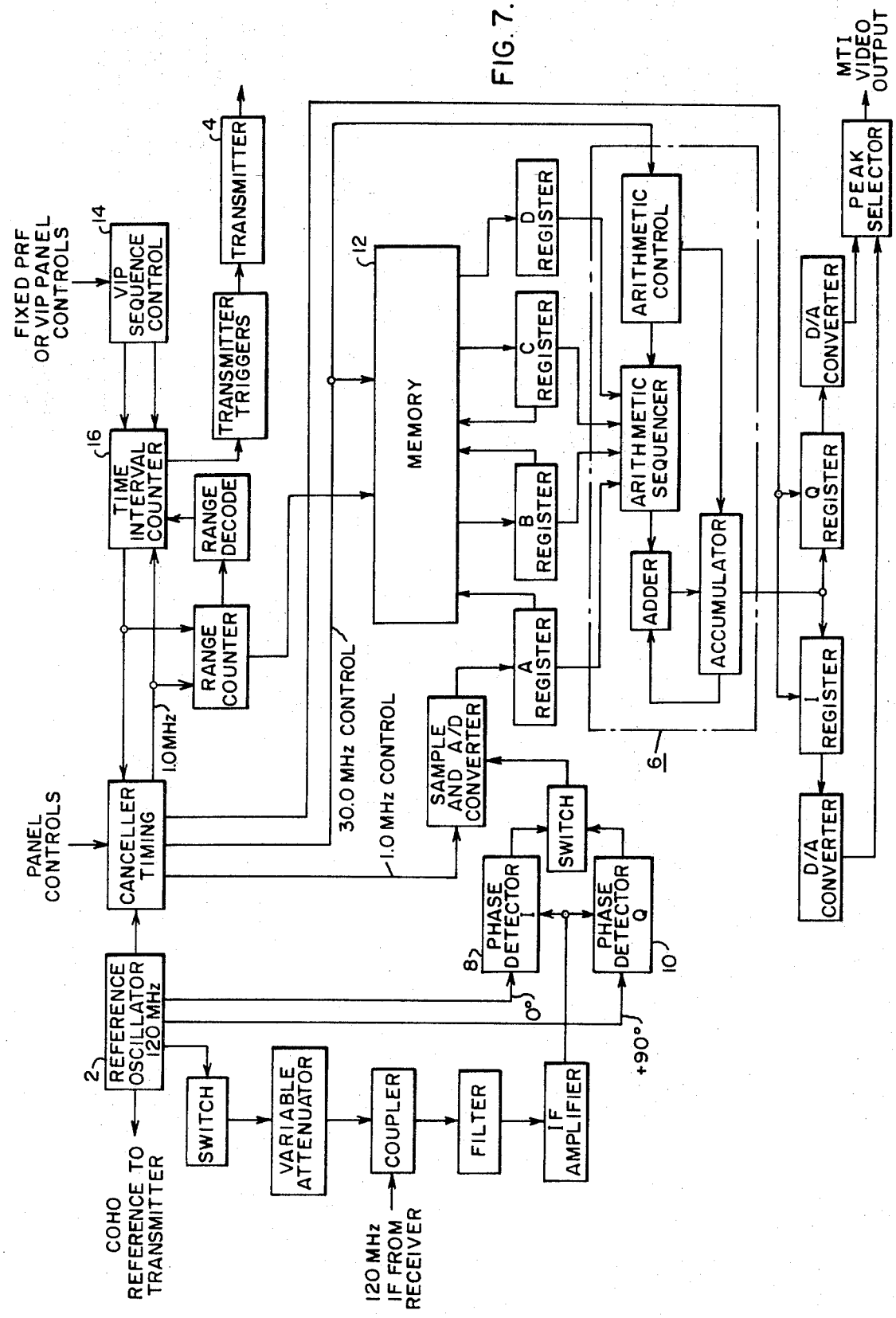
FIG. 7 is a schematic block diagram of an illustrative embodiment of the present invention.

Curves E and F of FIGS. 5 and 6, respectively, show the velocity responses for ten and eight pulse sequences having the same 10% exponential increment. Their minimum interpulse periods consequently differ; namely, 62.75% and 70% respectively. Typical apparatus for optimizing the variable interpulse period and the weighting factors for pulses A, B, C and D in a four pulse canceller is illustrated in FIG. 7. A stable oscillator 22 provides a coherent reference frequency for the transmitter 4 as well as the clock frequency for a digital canceller 6. The incoming pulse echo in the form of an incoming IF signal, after suitable amplification and filtering will be directly converted to bipolar video or synchronously detected by comparison with the reference frequency. Both in-phase and quadrature channels 8 and 10 are provided to improve detectability and to allow phase information to be extracted after cancellation if desired. The analog information at the output of the phase detector 8 and 10 is sampled and converted into an eight bit digital word.

The digital canceller 6 is a four pulse digital canceller which implements the equation:

$$\text{output} = aA - bB + cC - dD$$

where the capital letters represent successive pulses in a given range bin. The weighting factors (lower case letters) given to each of the successive pulses are chosen to be binarily related and weight the pulse magnitudes to improve the performance. A magnetic core stack 12 provides the necessary information storage.

The cancelled signals in the in-phase and quadrature channels are combined to provide the MTI video output by the canceller 6. The reference oscillator 2 provides all the necessary timing for the radar transmitter 4 as well as providing all internal timing for the canceller 6. A VIP sequence control 14 and time interval counter 16 will generate the exponential sawtooth sequence for the variable interpulse period. After selecting a starting value, each subsequent interpulse period can be computed by multiplying its predecessor by a fiixed factor. For example, the multiplying factor and best time interval counter for various exponential sawtooth patterns are as follows:

| Saw: | Multiplying factor | Best period counter |
|---|---|---|
| 8B | 1+3/32 | Binary. |
| 8 | 1+1/10 | Decimal or BCD. |
| 7A | 1+1/8 | Binary. |
| 8A | 1+1/8 | Do. |
| 7B | 1−3/32 | Do. |

The VIP patterns have been given an abbreviated designation to distinguish one from another, for Example 8B SAW. The numeral refers to the number of pulses in the VIP cycle; the SAW, the general form of the pattern; and the letters, different magnitudes of exponential increments.

Once the pulse echoes have been received and stored in the memory 12, the canceller 6 sums the latest received echo pulse A and the previous sequence B, C and D with binary weighting as for example:

| a | −b | c | −d |
|---|---|---|---|
| +.8750 | −2.8125 | +3.0625 | −1.1250 |
| +.8750 | −2.8125 | +3.0625 | −1.1250 |
| +.8750 | −2.8125 | +3.0625 | −1.1250 |
| +.8750 | −2.8125 | +3.0625 | −1.1250 |
| +.8750 | −2.8125 | +3.0625 | −1.1250 |
| +.8750 | −2.8125 | +3.0625 | −1.1250 |
| +1.1250 | −3.3125 | +2.6875 | −.5000 |
| +1.7500 | −3.2500 | +2.2500 | −.7500 |

A choice of weights $a$, $b$, $c$ and $d$ are presented in the foregoing table which creates a wider clutter notch at some specified level such as −60 db in exchange for a slow drop-off to a lower level.

When desired, the necessary weighting factors $a$, $b$, $c$ and $d$ for utilizing the turn-around in an exponential sawtooth may be blanked, thereby allowing these weighting factors to be omitted. As can be appreciated, this greatly simplifies the weighting coefficients to be established by the canceller 6. The canceller 6 contains binary gates which are capable of dividing in binary fashion to arrive at the binary relationships of weighting factors.

Figure 8:
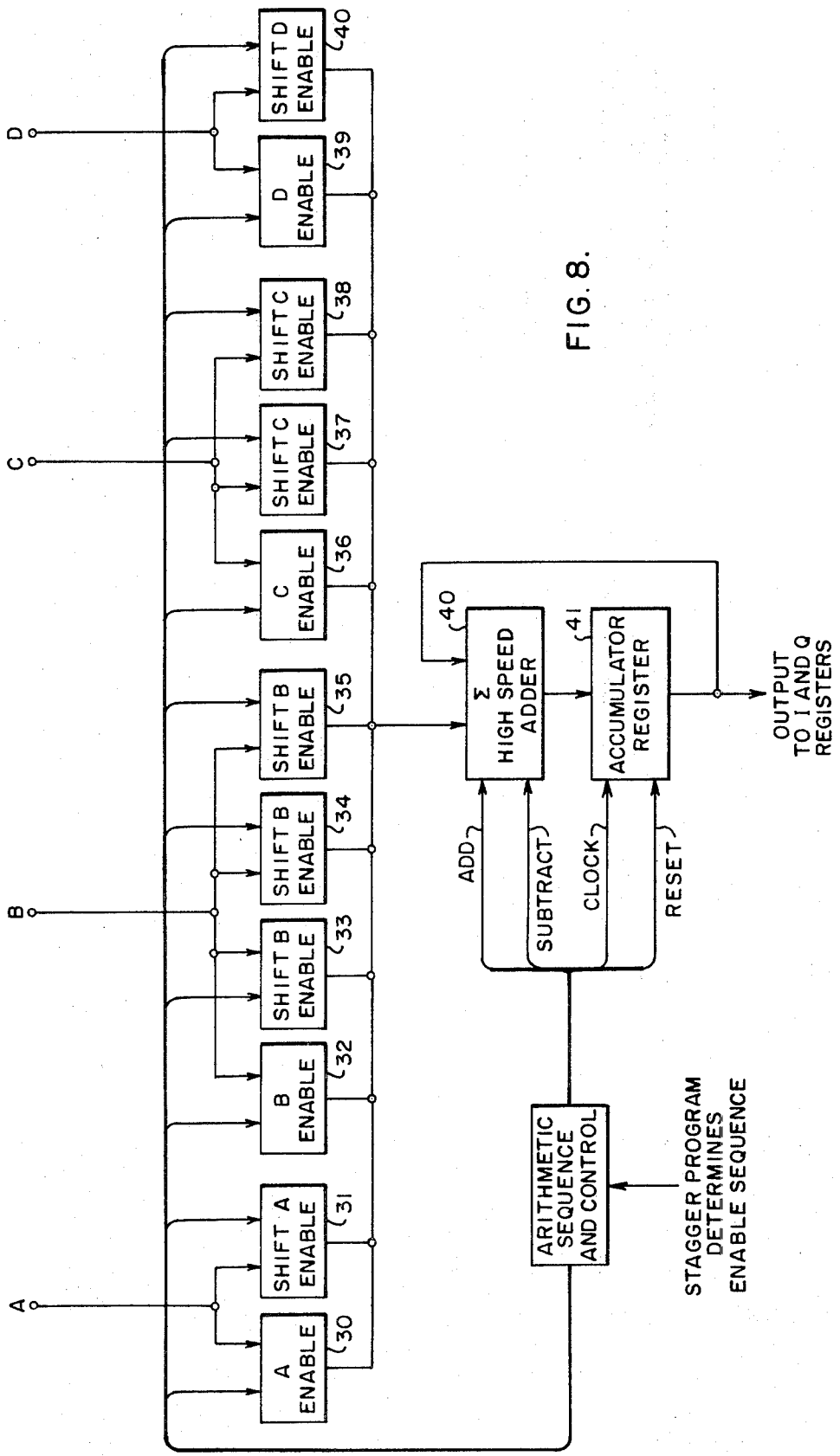
FIG. 8 is a schematic block diagram further detailing elements utilized in the illustrative embodiment of FIG. 7.

For example, referring to FIG. 8, pulse A in its unit value can pass through the gate 30 and then can be shifted to the right three places to obtain a divide by eight relationship in the gate 31. The one-eighth factor is then subtratced from the unity factor in the high speed adder 40 and fed to an accumulator register 41 where it combines with pulse echoes B, C and D. The echo pulse B is shifted a total of four places via gates 32, 33, 34 and 35 to provide a summation of $2^{13}/_{16}$ as a weighting coefficient $b$ for the echo pulse B. In the same manner, gates 36, 37 and 38 apply a binary factor coefficient to echo pulse C. Gates 39 and 40 perform an arithmetic operation on echo pulse D in the same manner that gates 30 and 31 did on echo pulse A. Reference should be made to the above mentioned patent application Ser. No. 776,410 for a more detailed explanation of the apparatus shown in FIGS. 7 and 8.

Figure 9:
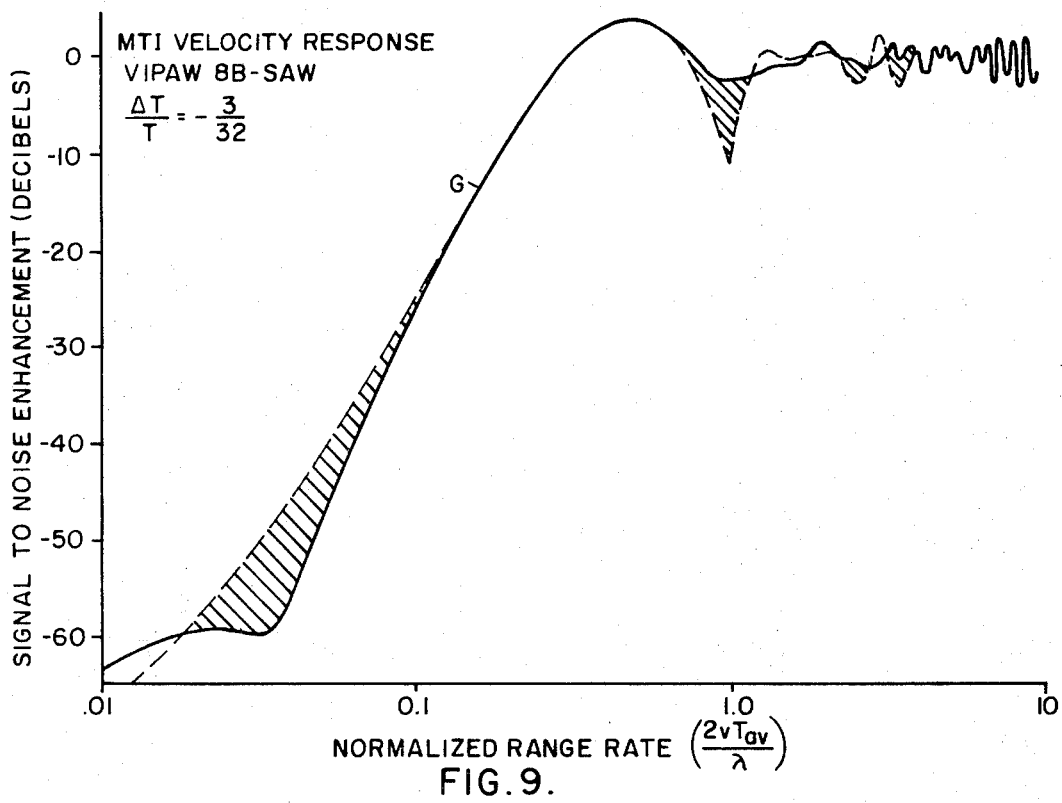
FIG. 9 is a graphical representation of additional performance characteristics when practicing the present invention.

The exponential sawtooth requires only three sets of weights to be stored and used. Its most important advantages, however, are its ability to give an acceptable velocity response characteristic with only seven or eight pulses in the VIP sequence and with a minimum interpluse of about 70% of the average. For these reasons, it is much more acceptable for a wider field of application than the exponential tent pattern. Curve G of FIG. 9 shows the response of an optimum eight pulse exponential sawtooth pattern; its improvement over the background standard is dramatic.

While the present invention has been described with a degree of particularity for the purposes of illustration, it is to be understood that all modifications, alterations and substitutions within the spirit and scope of the present invention are herein meant to be included.

For example the numerical samples given are for purposes of illustration. What is fundamental however is a variable interpulse period sequence following an exponentially increaisng and/or decreasing pattern to reduce the number of sets of weights which must be stored in the canceller 6.

An exponential pattern based on a binary or decimal increment or decrement so that the interpulse period sequence may be generated easily rather than stored is also desirable but not mandatory. This applies only to patterns which do not use both increasing and decreasing exponentials such as the exponential sawtooth B of FIG. 2.

As previously stated, an interpulse period pattern which avoids approximately duplicate choices or periods close to twice another is desirable to prevent blind conditions on several choices simultaneously.

The present invention provides a dramatic improvement in performance. For example, in comparison with the prior four pulse MPI canceller, completion of the interpulse period cycle is accomplished in only eight pulses rather than sixteen pulses. A clutter notch is obtained which is 75% wider at the −59 db level. An insensitivity is obtained at the first blind speed of only 2.5 db rather than 10.7 db.

I claim as my invention:

1. In a digital MTI radar system, the combination, comprising; means for transmitting pulses with a variable interpulse period following an exponentially increasing and/or decreasing pattern; means for receiving pulse echoes; means for comparing a sequence of said pulse echoes; and means for variably weighing the individual echoes when comparing said sequence to improve the velocity response of said system.

2. The combination of claim 1 wherein the increment with which the variable interpulse period is increased or decreased is binary in form.

3. The combination of claim 1 wherein the increment with which the variable interpulse period is changed is decimal in form.

4. The combination of claim 1 wherein the pulses are transmitted in a VIP pattern which avoids duplication of any interpulse period choices.

5. The combination of claim 5 wherein the ratio of interpulse period choices excludes any relationship close to a 2:1 ratio.

6. The combination of claim 1 wherein the exponential VIP pattern employed is an exponential sawtooth.

7. The combination of claim 6 wherein the echo pulses associated with the flyback region of said exponential sawtooth are blanked out.

8. The combination of claim 1 wherein the exponential VIP pattern employed is an exponential tent.

9. The combination of claim 8 wherein the received echo pulses associated with the turn-around region of the exponential tent are blanked out.

References Cited

UNITED STATES PATENTS 3,480,953   11/1969   Shreve _____ 343—7.7

RODNEY D. BENNETT, Primary Examiner

T. H. TUBBESING, Assistant Examiner

UNITED STATES PATENT OFFICE
CERTIFICATE OF CORRECTION

Patent No. 3,566,402    Dated February 23, 1971

Inventor(s) John W. Taylor, Jr.

It is certified that error appears in the above-identified patent and that said Letters Patent are hereby corrected as shown below:

Column 4, line 9, "a $\approx$ 1+3/2 $\Delta$ + T2/T2) + 1/2 ($\Delta$ T2/T2)$^2$",
should read: "a$\approx$1 + 3/2 $\Delta$ T2/T2 + 1/2 ($\Delta$ T2/T2)$^2$ Column 4, line 10, "d $\approx$ 1 - 3/2 ($\Delta$ T1/T1) + 1/2 ($\Delta$ T1/T2)$^2$'
should read: "d $\approx$ 1 - 3/2 ($\Delta$ T1/T2) + 1/2 ($\Delta$ T1/T Column 4, line 15, "m $\approx$ 4 ($\Delta$ T1/T2) + ..."
should read: "m $\approx$ 4 ($\Delta$ T1/T2 - $\Delta$ T2/T2) + ...".

Column 4, line 15, "... + [3 1/2 ($\Delta$ T1/T2 - $\Delta$ T2/T2)] ..."
should read: "... + [3-1/2 ( $\Delta$ T1/T2 - $\Delta$ T2/T2)].

Signed and sealed this 28th day of November 1972.

(SEAL)
Attest:

EDWARD M. FLETCHER, JR.
Attesting Officer

ROBERT GOTTSCHALK
Commissioner of Pat